United States Patent [19]

Heo

[11] Patent Number: 5,305,105
[45] Date of Patent: Apr. 19, 1994

[54] AUDIO/VIDEO SIGNAL INPUT TERMINAL CIRCUIT WITH AUTOMATIC SWITCHING FUNCTION

[75] Inventor: Man H. Heo, Daeku, Rep. of Korea

[73] Assignee: Gold Star Co., Ltd., Rep. of Korea

[21] Appl. No.: 29,464

[22] Filed: Mar. 11, 1993

[30] Foreign Application Priority Data

Mar. 11, 1992 [KR] Rep. of Korea .................. 3911/1992

[51] Int. Cl.$^5$ ........................ H04N 5/268; H04N 5/60
[52] U.S. Cl. ........................ 348/485; 348/705
[58] Field of Search ............ 358/144, 143, 181, 185, 358/86, 198; 360/137; H04N 5/268, 5/262, 5/222, 5/60

[56] References Cited

U.S. PATENT DOCUMENTS

| | | | |
|---|---|---|---|
| 4,907,085 | 3/1990 | Bingham | 358/181 |
| 4,954,880 | 9/1990 | Tanimizu | 358/181 X |
| 5,018,013 | 5/1991 | Rabii | 358/181 |

FOREIGN PATENT DOCUMENTS

| | | | |
|---|---|---|---|
| 58-142685 | 8/1983 | Japan | 358/181 |
| 61-274585 | 12/1986 | Japan | H04N 5/60 |
| 3-240378 | 10/1991 | Japan | H04N 5/268 |

*Primary Examiner*—James J. Groody
*Assistant Examiner*—Safet Metjahic
*Attorney, Agent, or Firm*—Ostrolenk, Faber, Gerb & Soffen

[57] ABSTRACT

An audio/video signals input terminal circuit comprising an input terminal section having a plurality of input terminals, a select control signal generating circuit for detecting the presence of a synchronous signal at the input terminals of the input terminal section and generating first and second select control signals in accordance with the detected result, an audio/video input switching circuit having a plurality of input port sets and a plurality of output ports, the audio/video input switching circuit selecting one of the input port sets inputting a video signal in response to the first and second select control signals, outputting the video signal inputted through the selected input port set through the corresponding output port and outputting right and left audio signals inputted through the other input port sets through the corresponding output ports, respectively, and an audio input switching circuit having a pair of input port sets and a pair of output ports, the audio input switching circuit selecting one of the input port sets in response to a select control signal which is generated from a microcomputer according to a user's selection and outputting the right and left audio signals inputted through the selected input port set through the corresponding output ports, respectively.

6 Claims, 4 Drawing Sheets

FIG. 4

| SIGNALS TO INPUT TERMINALS | | | SELECT CONTROL SIGNALS | | AUDIO/VIDEO INPUT SWITCHING CIRCUIT OUTPUT | | | CONTROL SIGNAL FROM MICRO-COMPUTER | INPUT SIGNALS TO SIGNAL PROCESSING CIRCUIT | | |
|---|---|---|---|---|---|---|---|---|---|---|---|
| A | B | C | S0 | S1 | V | R | L | M0 | Vi | $A_R$ | $A_L$ |
| Vi | $A_R$ | $A_L$ | 1 | 0 | PV1(V) | PR1(R) | PL1(L) | 1 | V | R | L |
| Vi | $A_L$ | $A_R$ | 1 | 0 | PV1(V) | PR1(L) | PL1(R) | 0 | ″ | ″ | ″ |
| $A_R$ | Vi | $A_L$ | 0 | 1 | PV2(V) | PR2(R) | PL2(L) | 1 | ″ | ″ | ″ |
| $A_R$ | $A_L$ | Vi | 0 | 0 | PV3(V) | PR3(L) | PL3(R) | 0 | ″ | ″ | ″ |
| $A_L$ | Vi | $A_R$ | 0 | 1 | PV2(V) | PR2(L) | PL2(R) | 0 | ″ | ″ | ″ |
| $A_L$ | $A_R$ | V | 0 | 0 | PV3(L) | PR3(R) | PL3(L) | 1 | ″ | ″ | ″ |

AUDIO/VIDEO SIGNAL INPUT TERMINAL CIRCUIT WITH AUTOMATIC SWITCHING FUNCTION

BACKGROUND OF THE INVENTION

1. Field of the Invention

The present invention relates in general to an audio/video signals input terminal circuit for a television or a video cassette recorder, and more particularly to an audio/video signals input terminal circuit with an automatic switching function, wherein audio and video signals from a signal source are automatically inputted to corresponding audio and video signals processing circuits, respectively, when the audio and video signals are indiscriminately inputted through certain input terminals, so that there can be prevented a malfunction due to an erroneous signal input.

2. Description of the Prior Art

Referring to FIG. 1, there is shown a block diagram of a conventional audio/video signals input terminal circuit. As shown in this drawing, the conventional audio/video signals input terminal circuit comprises an input terminal section 1 having three input terminals A, B and C connected, respectively, to a video signal processing circuit 2 and right and left audio signals processing circuits 3 and 4. A video signal Vi from an external signal source is inputted to the video signal processing circuit 2 through the input terminal section 1. Right and left audio signals $A_R$ and $A_L$ from the external signal source are inputted to the right and left audio signals processing circuits 3 and 4 through the input terminal section 1, respectively. The processed video signal Vi from the video signal processing circuit 2 is applied to a cathode ray tube (CRT) and the processed stereo audio signals $A_R$ and $A_L$ from the right and left audio signals processing circuits 3 and 4 are applied to right and left speakers, respectively. As a result, a viewer can listen to a stereo sound as well as watch a video picture.

However, the three input terminals A, B and C in the input terminal section 1 are specified as a video signal input terminal for inputting the video signal Vi, a right audio signal input terminal for inputting the right audio signal $A_R$ and a left audio signal input terminal for inputting the left audio signal $A_L$, respectively. Also, the right and left audio signals processing circuits 3 and 4 are of the same construction, but are specified to apply their output signals to the right and left speakers, respectively. As a result, in the conventional audio/video signals input terminal circuit with the above-mentioned construction, the video signal Vi must be inputted to the video signal input terminal A connected to the video signal processing circuit 2, the right audio signal $A_R$ must be inputted to the right audio signal input terminal B connected to the right audio signal processing circuit 3 and the left audio signal $A_L$ must be inputted to the left audio signal input terminal C connected to the left audio signal processing circuit 4. Provided that the video signal Vi and the right and left audio signals $A_R$ and $A_L$ are not inputted to the corresponding specified input terminals A, B and C, the signal processing circuits 2, 3 and 4 do not perform normal signal processes, thereby causing the user not to watch a normal video picture and not to listen to a normal stereo sound.

For this reason, external audio and video jacks must accurately be connected to the corresponding input terminals A, B and C in the input terminal section 1 for the normal signal processes in the signal processing circuits 2, 3 and 4, resulting in an inconvenience in use. Also, in erroneous connections, there is no output of the audio and video signals. In this case, the user may misjudge the erroneous connections as a malfunction of the equipment. Although the erroneous connections have been recognized by the user, re-connections are required resulting in an inconvenience. Furthermore, in case where the signal source is far apart from the equipment, audio and video signal lines must be identified one by one for connections to the corresponding input terminals. This results in a further inconvenience.

SUMMARY OF THE INVENTION

Therefore, the present invention has been made in view of the above problems, and it is an object of the present invention to provide an audio/video signals input terminal circuit with an automatic switching function, wherein audio and video signals from a signal source are automatically inputted to corresponding audio and video signals processing circuits, respectively, when the audio and video signals are indiscriminately inputted through certain input terminals, so that a malfunction due to an erroneous signal input can be prevented and greater convenience in use may be provided.

In accordance with the present invention, the above and other objects can be accomplished by a provision of an audio/video signals input terminal circuit comprising: input terminal means having first to third input terminals for inputting a video signal and right and left audio signals irrespective of signal lines, respectively; select control signal generating means for detecting the presence of a synchronous signal at said first to third input terminals of said input terminal means and generating first and second select control signals in accordance with the detected result, the first and second select control signals containing information regarding one of said first to third input terminals through which the video signal is inputted; audio/video input switching means having first to third input port sets and video and right and left audio signals output ports, said audio/video input switching means selecting one of said first to third input port sets inputting the video signal in response to the first and second select control signals from said select control signal generating means, outputting the video signal inputted through the selected input port set to video signal processing means through said video signal output port and outputting the right and left audio signals inputted through the other input port sets through said right and left audio signals output ports, respectively; and audio input switching means having first and second input port sets and right and left audio signals output ports, said audio input switching means selecting one of said first and second input port sets in response to a select control signal which is generated from a microcomputer according to a user's selection and outputting the right and left audio signals inputted through the selected input port set to right and left audio signals processing means through said right and left audio signals output ports, respectively.

BRIEF DESCRIPTION OF THE DRAWINGS

The above and other objects, features and advantages of the present invention will be more clearly understood from the following detailed description taken in conjunction with the accompanying drawings, in which:

FIG. 4 is a table illustrating input/output states of the audio/video signals input terminal circuit of FIG. 2.

DETAILED DESCRIPTION OF THE PREFERRED EMBODIMENTS

Figure 1:
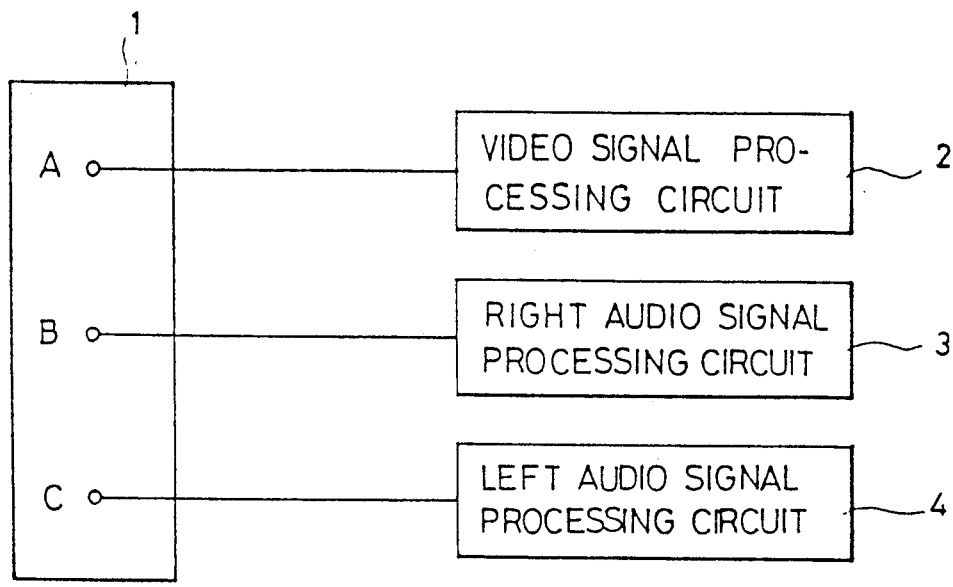
FIG. 1 is a block diagram of a conventional audio/video signals input terminal circuit.
Figure 2:
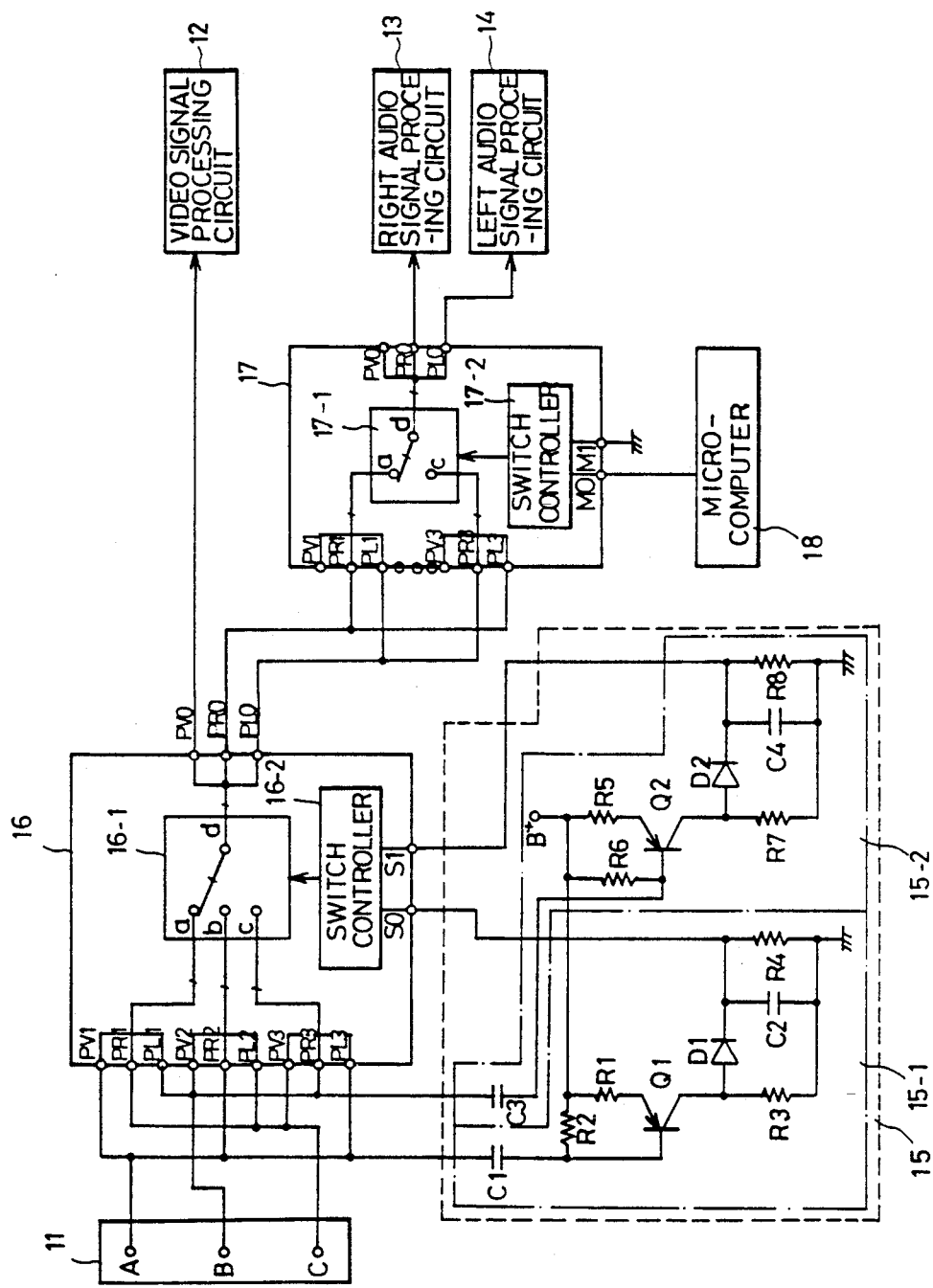
FIG. 2 is a circuit diagram of an audio/video signals input terminal circuit with an automatic switching function in accordance with the present invention.

Referring to FIG. 2, there is shown a circuit diagram of an audio/video signals input terminal circuit with an automatic switching function in accordance with the present invention. As shown in this figure, the audio/video signals input terminal circuit of the present invention comprises an input terminal section 11 having three input terminals A, B and C for inputting a video signal Vi and right and left audio signals $A_R$ and $A_L$ irrespective of signal lines, respectively, and a select control signal generating circuit 15 for detecting the presence of a synchronous signal at the input terminals A, B and C of the input terminal section 11 and generating select control signals S0 and S1 in accordance with the detected result, the select control signals S0 and S1 containing information regarding one of the input terminals A, B and C through which the video signal Vi is inputted.

An audio/video input switching circuit 16 has first to third input port sets and video and right and left audio signals output ports PVo, PRo and PLo. The first input port set has a first video signal input port PV1 connected to the input terminal A in the input terminal section 11, a first right audio signal input port PR1 connected to the input terminal C in the input terminal section 11 and a first left audio signal input port PL1 connected to the input terminal B in the input terminal section 11. The second input port set has a second video signal input port PV2 connected to the input terminal B, a second right audio signal input port PR2 connected to the input terminal A and a second left audio signal input port PL2 connected to the input terminal C. The third input port set has a third video signal input port PV3 connected to the input terminal C, a third right audio signal input port PR3 connected to the input terminal B and a third left audio signal input port PL3 connected to the input terminal A. The audio/video input switching circuit 16 selects one of the first to third input port sets inputting the video signal Vi in response to the select control signals S0 and S1 from the select control signal generating circuit 15, outputs the video signal Vi inputted through the selected input port set to a video signal processing circuit 12 through the video signal output port PVo and outputs the right and left audio signals $A_R$ and $A_L$ inputted through the other input port sets through the right and left audio signals output ports PRo and PLo, respectively.

An audio input switching circuit 17 has first and second input port sets and right and left audio signals output ports PRo and PLo. The first input port set has a first right audio signal input port PR1 connected to the right audio signal output port PRo of the audio/video input switching circuit 16 and a first left audio signal input port PL1 connected to the left audio signal output port PLo of the audio/video input switching circuit 16. The second input port set has a second right audio signal input port PR3 connected to the left audio signal output port PLo of the audio/video input switching circuit 16 and a second left audio signal input port PL3 connected to the right audio signal output port PRo of the audio/video input switching circuit 16. The audio input switching circuit 17 selects one of the first and second input port sets in response to a select control signal which is generated from a microcomputer 18 according to a user's selection and outputs the right and left audio signals $A_R$ and $A_L$ inputted through the selected input port set to right and left audio signals processing circuits 13 and 14 through the right and left audio signals output ports PRo and PLo, respectively.

The select control signal generating circuit 15 includes first and second select control signal generators 15-1 and 15-2 of the same construction, the first select control signal generator 15-1 detecting the presence of the synchronous signal at one of the input terminals A, B and C in the input terminal section 11 and generating the select control signal S0 in accordance with the detected result, the second select control signal generator 15-2 detecting the presence of the synchronous signal at a different one of the input terminals A, B and C in the input terminal section 11 and generating the select control signal S1 in accordance with the detected result.

The first select control signal generator 15-1 includes a PNP type transistor Q1 having its base connected to one (A in the preferred embodiment) of the input terminals A, B and C through a condenser C1 and connected to a power source terminal B+ through a resistor R2, its emitter connected to the power source terminal B+ through a resistor R1 and its collector connected to a ground through a resistor R3 and connected through a diode D1 to one sides of a condenser C2 and a resistor R4, the other sides of which are connected to the ground, the select control signal S0 being generated at the connection of the collector of the PNP type transistor Q1, the condenser C2 and the resistor R4 through the diode D1.

Figure 3:
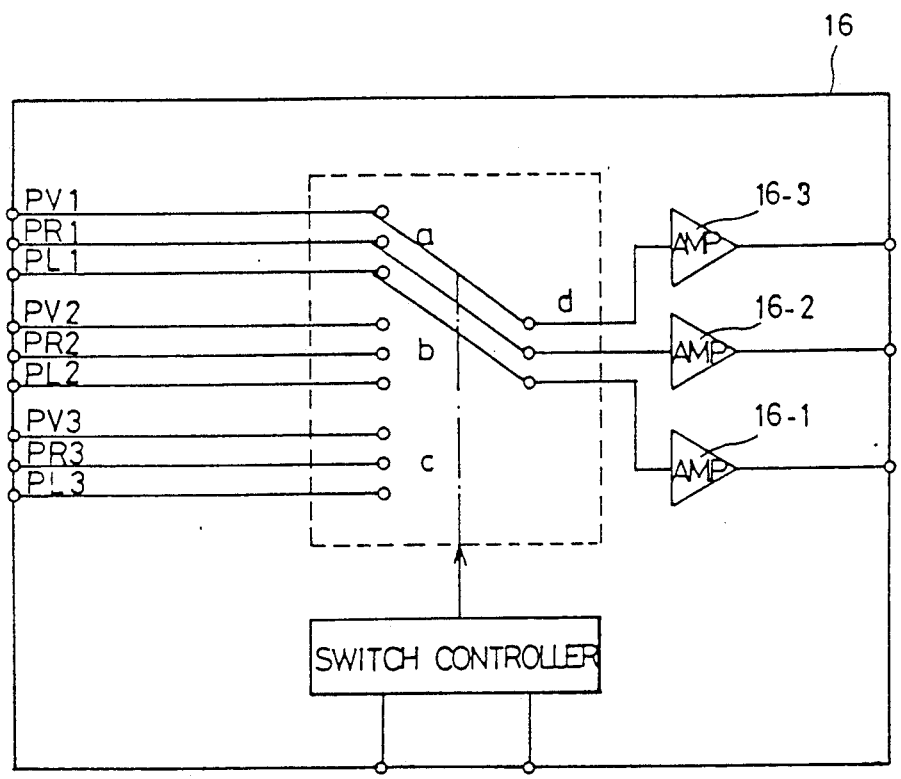
FIG. 3 is a detailed circuit diagram of an audio/video input switching circuit in FIG. 2.

Referring to FIG. 3, there is shown a detailed circuit diagram of the audio/video input switching circuit 16 in FIG. 2. As shown in this drawing, the audio/video input switching circuit 16 includes, on a single chip, a switch controller 16-2 for generating a switching signal in response to the select control signals S0 and S1 from the select control signal generating circuit 15, a multi-switch 16-1 for selecting one of the first to third input port sets in response to the switching signal from the switch controller 16-2, and first to third signal amplifiers 16-3, 16-4 and 16-5 each for amplifying a corresponding one of output signals from the multi-switch 16-1 and outputting the amplified signal to a corresponding one of the video signal output port PVo and the right and left audio signals output ports PRo and PLo.

Also, the audio input switching circuit 17 has, on a single chip, substantially the same construction as that of the audio/video input switching circuit 16. Namely, as shown in FIG. 2, the audio input switching circuit 17 includes, on a single chip, a switch controller 17-2 for generating a switching signal in response to the select control signal from the microcomputer 18, a multi-switch 17-1 for selecting one of the first and second input port sets in response to the switching signal from the switch controller 17-2, and first and second signal amplifiers (not shown) each for amplifying a corresponding one of output signals from the multi-switch 17-1 and outputting the amplified signal to a corresponding one of the right and left audio signals output ports PRo and PLo.

The operation of the audio/video signals input terminal circuit with the above-mentioned construction in accordance with the present invention will hereinafter be described in detail with reference to FIG. 4 which is a table illustrating input/output states of the audio/video signals input terminal circuit.

First, signal jacks of an external signal source are connected to the input terminals A, B and C in the input terminal section 11, so that the video signal Vi and the right and left audio signals $A_R$ and $A_L$ are inputted through the input terminals A, B and C. The video signal Vi and the right and left audio signals $A_R$ and $A_L$ are inputted to the corresponding input ports PV1, PR1 and PL1, PV2, PR2 and PL2 and PV3, PR3 and PL3 of the first to third input port sets in the audio/video input switching circuit 16 through the input terminals A, B and C in the input terminal section 11.

At this time, the select control signal generating circuit 15 detects the presence of the synchronous signal at the input terminals (A and B in the preferred embodiment) and generates the select control signals S0 and S1 in accordance with the detected result, the select control signals S0 and S1 containing information regarding one of the input terminals A, B and C through which the video signal Vi is inputted. For example, provided that the video signal Vi is inputted through the input terminal A, the synchronous signal of the video signal Vi is applied to the first select control signal generator 15-1, thereby causing the transistor Q1 to be turned on. As a result outputted from the collector of the transistor Q1 is a pulse signal corresponding to the synchronous signal of the video signal Vi. The synchronous signal of the video signal Vi or the pulse signal from the collector of the transistor Q1 is passed through the diode D1 and then smoothed by the condenser C2, and is thus applied as the select control signal S0 of high level to the audio/video input switching circuit 16. At the same time, the audio signal is applied to the second select control signal generator 15-2. The absence of the synchronous signal causes a transistor Q2 not to be turned on. As a result, the second select control signal generator 15-2 applies the select control signal S1 of low level to the audio/video input switching circuit 16.

In this manner, when the video signal Vi is inputted through the input terminal A in the input terminal section 11, the select control signal generating circuit 15 outputs the select control signal S0 of high level and the select control signal S1 of low level to the audio/video input switching circuit 16. In accordance with S0="1" and S1="0", the switch controller 16-2 controls the multi-switch 16-1 to connect a movable terminal set d to a fixed terminal set a.

Therefore, the video signal Vi inputted through the input terminal A is outputted through the video signal output port PVo of the audio/video input switching circuit 16 to the video signal processing circuit 12 and the audio signals inputted through the input terminals B and C are outputted respectively through the left and right audio signal output ports PLo and PRo of the audio/video input switching circuit 16 to the audio input switching circuit 17.

The audio signal from the right audio signal output port PRo of the audio/video input switching circuit 16 is applied to the first right audio signal input port PR1 of the first input port set and the second left audio signal input port PL3 of the second input port set in the audio input switching circuit 17. The audio signal from the left audio signal output port PLo of the audio/video input switching circuit 16 is applied to the first left audio signal input port PL1 of the first input port set and the second right audio signal input port PR3 of the second input port set in the audio input switching circuit 17.

Under the condition that a movable terminal set d of the multi-switch 17-1 in the audio input switching circuit 17 is connected to a fixed terminal set a thereof, the audio signals from the right and left audio signals output ports PRo and PLo of the audio/video input switching circuit 16 are outputted through the audio input switching circuit 17 to the right and left audio signals processing circuits 13 and 14, respectively. As a result, the audio signal inputted through the input terminal C in the input terminal section 11 is outputted to a speaker (not shown) which is connected to the right audio signal processing circuit 13 and the audio signal inputted through the input terminal B in the input terminal section 11 is outputted to a speaker (not shown) which is connected to the left audio signal processing circuit 14.

On the other hand, in case that the audio signal inputted through the input terminal B in the input terminal section 11 is the right audio signal $A_R$ and the audio signal inputted through the input terminal C in the input terminal section 11 is the left audio signal $A_L$, the left and right-changed audio signals will be outputted through the speakers under the above condition. In this case, the microcomputer 18 generates the control signal as the user operates a select switch or a remote control transmitter, not shown, to select the left and right correction of the audio signals. In response to the control signal from the microcomputer 18, the switch controller 17-2 controls the multi-switch 17-1 to connect the movable terminal set d to a fixed terminal set c, so that the audio signals from the right and left audio signals output ports PRo and PLo of the audio/video input switching circuit 16 are outputted through the audio input switching circuit 17 to the left and right audio signals processing circuits 14 and 13, respectively. As a result, the right audio signal inputted through the input terminal B in the input terminal section 11 is outputted to the speaker which is connected to the right audio signal processing circuit 13 and the left audio signal inputted through the input terminal C in the input terminal section 11 is outputted to the speaker which is connected to the left audio signal processing circuit 14.

In this connection, the input terminals of the input terminal section 11 are not limited in use and the external signal jacks can thus be connected indiscriminately to the input terminals by the user. Namely, although the external signal jacks have indiscriminately been connected to the input terminals in the input terminal section 11 by the user, the video signal is outputted to the video signal processing circuit 12 by the audio/video input switching circuit 16 and the audio signals are outputted to the audio signals processing circuits 13 and 14 by the audio input switching circuit 17, resulting in the normal audio and video signal processes. Also, in the case where the left and right-changed audio signals are outputted to the speakers, the audio input switching circuit 17 corrects the left and right of the audio signals according to the user's selection. As a result, the user is capable of listening to the normal stereo sound.

As hereinbefore described, according to the present invention, there is provided the audio/video signals input terminal circuit employing the switching integrated circuits (ICs), whereby the audio and video signals from the signal source are automatically inputted to the corresponding audio and video signals processing circuits, respectively, when the audio and video signals are indiscriminately inputted through certain input terminals. Therefore, there is no necessity for identifying the audio and video signal lines one by one for connections to the corresponding input terminals. This results in a convenience in use.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An audio/video signal input terminal circuit comprising:
   input terminal means having three input terminals comprising first to third input terminals for inputting a video signal and right and left audio signals irrespective of signal lines, respectively,
   select control signal generating means for detecting the presence of a synchronous signal at two of said three input terminals of said input terminal means and for generating first and second select control signals in accordance with a result of said detecting, the first and second select control signals containing information regarding one of said first to third input terminals through which the video signal is inputted;
   audio/video input switching means having first to third input port sets and video and right and left audio signal output ports, said audio/video input switching means selecting one of said first to third input port sets inputting the video signal in response to the first and second select control signals from said select control signal generating means, outputting the video signal inputted through the selected input port set to video signal processing means through said video signal output port and outputting the right and left audio signals inputted through the other input port sets through said right and left audio signal output ports, respectively; and
   audio input switching means having first and second input port sets and right and left audio signal output ports, said audio input switching means selecting one of said first and second input port sets in response to a select control signal which is generated from a microcomputer according to a user's selection and outputting the right and left audio signals inputted through the selected input port set to right and left audio signals processing means through said right and left audio signals output ports, respectively.

2. An audio/video signal input terminal circuit as set forth in claim 1, wherein said first input port set of said audio/video input switching means has a first video signal input port connected to said first input terminal of said input terminal means, a first right audio signal input port connected to said third input terminal of said input terminal means and a first left audio signal input port connected to said second input terminal of said input terminal means; said second input port set of said audio/video input switching means has a second video signal input port connected to said second input terminal of said input terminal means, a second right audio signal input port connected to said first input terminal of said input terminal means and a second left audio signal input port connected to said third input terminal of said input terminal means; and said third input port set of said audio/video input switching means has a third video signal input port connected to said third input terminal of said input terminal means, a third right audio signal input port connected to said second input terminal of said input terminal means and a third left audio signal input port connected to said first input terminal of said input terminal means.

3. An audio/video signal input terminal circuit as set forth in claim 1, wherein said select control signal generating means includes first and second select control signal generators of the same construction, said first select control signal generator detecting the presence of the synchronous signal at said two of said first to third input terminals of said input terminal means and generating the first select control signal in accordance with the detected result, said second select control signal generator detecting the presence of the synchronous signal at said two of said first to thrid input terminals of said input terminal means and generating the second select control signal in accordance with said result.

4. An audio/video signal input terminal circuit as set forth in claim 3, wherein said first and second select control signal generators each includes a PNP type transistor having its base connected to a corresponding one of said first to third input terminals of said input terminal means through a first condenser and connected to a power source terminal through a first resistor, its collector connected to the power source terminal through a second resistor and its emitter connected to a ground through a third resistor and connected through a diode to one side of a second condenser and a fourth resistor, the other sides of which are connected to the ground, the first and second select control signals each being generated at the connection of the collector of said PNP type transistor, said second condenser and said fourth resistor through said diode.

5. An audio/video signal input terminal circuit as set forth in claim 1, wherein said audio/video input switching means includes on a single chip:
   a switch controller for generating a switching signal in response to the first and second select control signals from said select control signal generating means;
   a multi-switch for selecting one of said first to third input port sets of said audio/video input switching means in response to the switching signal from said switch controller; and
   first to third signal amplifiers each for amplifying a corresponding one of output signals from said multi-switch and outputting the amplified signal to a corresponding one of said video signal output port and said right and left audio signal output ports of said audio/video input switching means.

6. An audio/video signal input terminal circuit as set forth in claim 5, wherein said audio input switching means has, on a single chip, substantially the same construction as that of said audio/video input switching means; said first input port set of said audio input switching means has a first right audio signal input port connected to said right audio signal output port of said audio/video input switching means and a first left audio signal input port connected to said left audio signal output port of said audio/video input switching means; and said second input port set of said audio input switching means has a second right audio signal input port connected to said left audio signal output port of said audio/video input switching means and a second left audio signal input port connected to said right audio signal output port of said audio/video input switching means.

* * * * *